US011951513B1

(12) United States Patent
Leonard

(10) Patent No.: US 11,951,513 B1
(45) Date of Patent: Apr. 9, 2024

(54) GRANULAR MATERIAL MANIPULATION DEVICE

(71) Applicant: James Leonard, Lewisberry, PA (US)

(72) Inventor: James Leonard, Lewisberry, PA (US)

(*) Notice: Subject to any disclaimer, the term of this patent is extended or adjusted under 35 U.S.C. 154(b) by 0 days.

(21) Appl. No.: 18/116,653

(22) Filed: Mar. 2, 2023

(51) Int. Cl.
*B07B 1/02* (2006.01)

(52) U.S. Cl.
CPC ........................... *B07B 1/02* (2013.01)

(58) Field of Classification Search
CPC .... B07B 1/02; B07B 1/16; B07B 1/28; B01D 2221/08
See application file for complete search history.

(56) References Cited

U.S. PATENT DOCUMENTS 5,931,517 A * 8/1999 Welch .................. B07B 1/02 209/418
10,709,112 B1 * 7/2020 Times-Dudley ..... A01K 23/005
2008/0265592 A1 * 10/2008 Askinasi ............ E01H 1/1206 294/1.4

* cited by examiner

*Primary Examiner* — Jacob S. Scott
*Assistant Examiner* — Miraj T. Patel
(74) *Attorney, Agent, or Firm* — PATENTFILE, LLC; Bradley C. Fach; Steven R. Kick

(57) ABSTRACT

A granular material manipulation device may include an upper handle and a lower handle. One or more upper arms may be coupled to the upper handle so that the upper arms may extend away from the upper handle. One or more lower arms may be coupled to the lower handle so that the lower arms may extend away from the lower handle. A positioning pivot may be configured to enable the device to be movable between a first and a second position. The lower arms may be positioned relatively closer to the upper arms in the first position, and the lower arms may be positioned relatively farther from the upper arms in the second position. Preferably, the device may be biased to the first position. A plate may be pivotally coupled to the first upper arm and/or to the second upper arm via one or more plate pivots.

19 Claims, 8 Drawing Sheets

GRANULAR MATERIAL MANIPULATION DEVICE

FIELD OF THE INVENTION

This patent specification relates to the field of devices which may be used to separate granular materials from wet mixtures, such as slurries, via wet gravity separation and from dry mixtures, such as dry sediments, via dry gravity separation.

BACKGROUND

Artisanal gold-mining is responsible for more than one third of the planetary mercury poisoning and is the largest of all the Mercury polluters. The vast majority of this pollution coming from these miners is by panning. The Minamata Convention has asked signatory nations to work on improved capture rates of gold in order to convince miners to stop using Mercury. No nation or pan device has yet been able to achieve the 95% capture rate that would be the tipping point for them to do so. Currently the best pan available has an 86% capture.

All configurations of existing mining pans are limited in their ability to remove tailings without disturbing settled values or desired granular materials that have been concentrated in those pans. This results in the user inadvertently disturbing the concentrate and remixing many of the fine particles of gold or other desired values with the tailings which are then ejected from those pans. Additionally, the values are shifted from their collection point by this turbulent processing and will have to be periodically re-stratified and this process is repeated several times again removing more of the gangue. At each time, more fine gold and other desired values are ejected and lost. It is not uncommon for these existing pans to have losses in the range of 14 to 40 percent or more.

Therefore, a need exists for a novel granular material manipulation device which may be used for separating and retaining granular material. A further need exists for a novel granular material manipulation device which may be used for separating granular material that enables a far greater amount of gold and other desired values to be retained in the pan than is possible using existing devices.

BRIEF SUMMARY OF THE INVENTION

A granular material manipulation device which may be used for separating granular material is provided. The device may be used for separating granular material from a slurry in a pan without the use of mercury which is desirable by the US department of State, EPA, United Nations and the other 128 signatories of the Minamata Convention as it brings the artisanal mining sector into treaty compliance.

In some embodiments, the device may include an upper handle and a lower handle. A first upper arm may be coupled to the upper handle and may extend away from the upper handle. A first lower arm may be coupled to the lower handle and may extend away from the lower handle. A positioning pivot may be configured to enable the device to be movable between a first position and a second position. Generally, the lower arm may be positioned relatively closer to the upper arm when the device is in the first position, and the lower arm may be positioned relatively farther from the upper arm when the device is in the second position. Preferably, the device may be biased to the first position. A plate may be pivotally coupled to the first upper arm via a plate pivot.

In further embodiments, the device may include an upper handle and a lower handle. A first upper arm and a second upper arm may be coupled to the upper handle and may extend away from the upper handle. A first lower arm and a second lower arm may be coupled to the lower handle and may extend away from the lower handle. A positioning pivot may be configured to enable the device to be movable between a first position and a second position. Generally, the lower arms may be positioned relatively closer to the upper arms when the device is in the first position, and the lower arms may be positioned relatively farther from the upper arms when the device is in the second position. Preferably, the device may be biased to the first position. A plate may be pivotally coupled to the first upper arm via a plate pivot and pivotally coupled to the second upper arm via a second plate pivot.

Numerous objects, features and advantages of the present invention will be readily apparent to those of ordinary skill in the art. Some example objects of the present invention are listed below.

One object of the present invention is to provide a granular material manipulation device that requires minimal capital cost while enabling the achievement of greater than 90% capture rate of desired materials, such as gold, in a gold mining pan.

A further object is to provide a granular material manipulation device that provides a higher gold capture rate than panning with mercury amalgam thereby offering a pathway away from toxic mercury processing.

It is another object is to provide a granular material manipulation device that is able to decant gangue by rapid mass wasting and only after stratification process and optionally taking less than two seconds.

Another object is to provide a granular material manipulation device that is able to achieve necessary capture rates in a gold mining pan to dissuade Mercury use.

A further object is to provide a granular material manipulation device that is able to achieve a high enough values capture rate in a gold mining pan to satisfy Minamata Convention guidelines for Mercury pollution mitigation.

Another object is to provide a granular material manipulation device that is able to eliminate practices by artisanal miners and abandon the use of mercury for processing gold (cost versus profit).

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
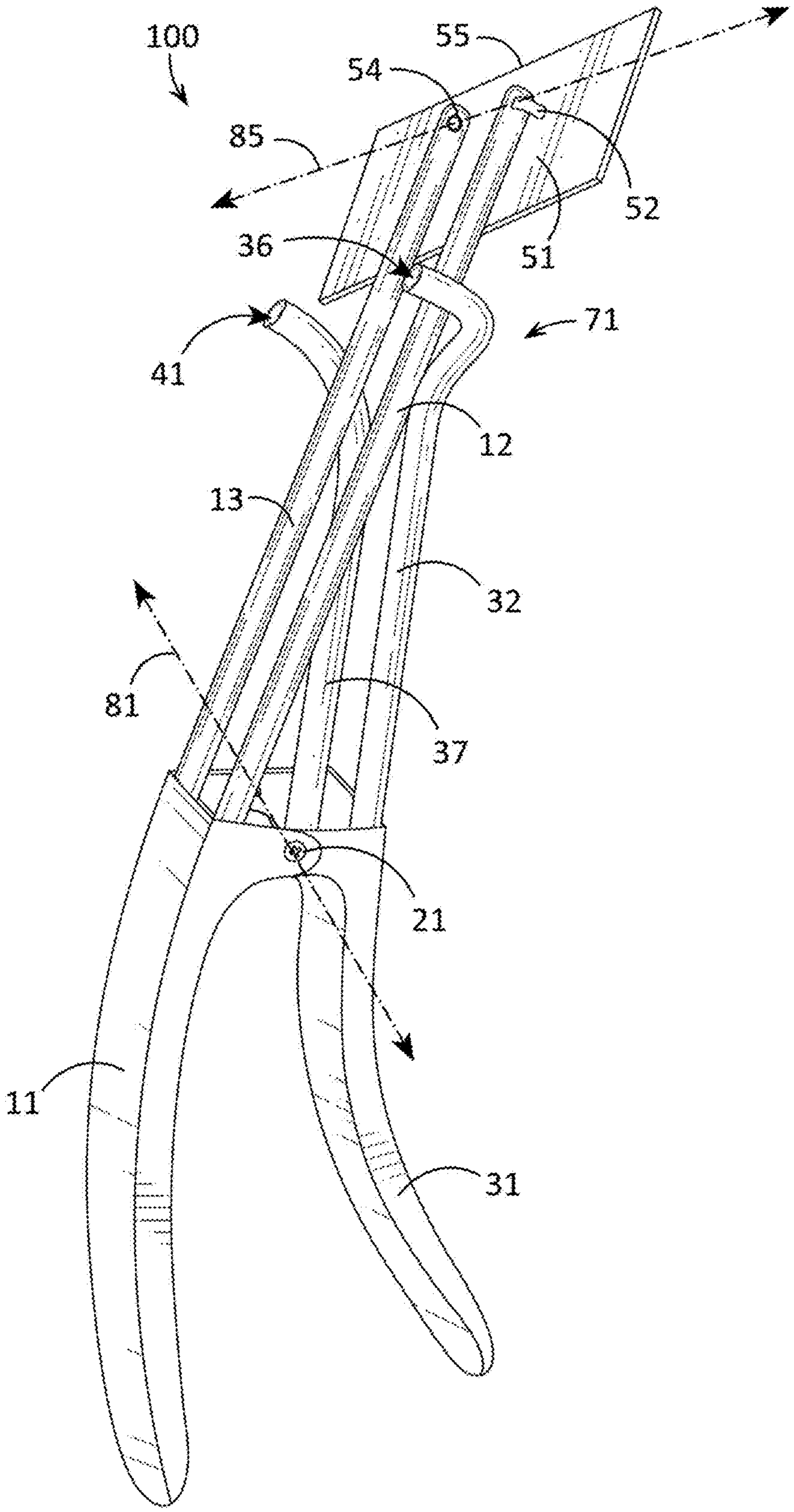
FIG. 1 depicts a perspective view of an example of a granular material manipulation device in a first position according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 15% of the specified number. Additionally, as used in this application, the term "substantially" means that the actual value is within about 10% of the actual desired value, more preferably within about 5% of the actual desired value and even more preferably within about 1% of the actual desired value of any variable, element or limit set forth herein.

A new granular material manipulation device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIG. 1 illustrates an example of a granular material manipulation device ("the device") 100 according to various embodiments. In some embodiments, the device 100 may comprise an upper handle 11 and a lower handle 31. One or more upper arms 12, 13, may be coupled to the upper handle 11 so that the upper arms 12, 13, may extend away from the upper handle 11. One or more lower arms 32, 37, may be coupled to the lower handle 31 so that the lower arms 32, 37, may extend away from the lower handle 31. A positioning pivot 21 may be configured to enable the device 100 to be movable between a first position 71 and a second position 72. Generally, the lower arms 32, 37, may be positioned relatively closer to the upper arms 12, 13, when the device 100 is in the first position 71, and the lower arms 32, 37, may be positioned relatively farther from the upper arms 12, 13, when the device 100 is in the second position 72. Preferably, the device 100 may be biased to the first position 71. A plate 51, 51A, 51B, may be pivotally coupled to the first upper arm 12 and/or to the second upper arm 13 via one or more plate pivots 52, 54.

In some embodiments, the device 100 may comprise an upper handle 11 and a lower handle 31 that may be movable relative to each other via a movable coupling provided by a positioning pivot 21. An upper handle 11 and a lower handle 31 may be configured in any shape and size. In preferred embodiments, an upper handle 11 and a lower handle 31 may comprise a curved shape. In further preferred embodiments, an upper handle 11 may comprise a curved shape and a lower handle 31 may comprise a curved shape which may be complementary to the curved shape of the upper handle 11. For example, and as perhaps best shown in FIGS. 1, and 4-7, the upper handle 11 may comprise a concave curved shape and a lower handle 31 may comprise a convex curved shape. In further embodiments, upper handle 11 and a lower handle 31 may comprise a linear or straight shape. Optionally, an upper handle 11 and/or a lower handle 31 may comprise a rubber, silicone, or other grip enhancing or cushioning material.

Preferably, an upper handle 11 may be elongated in shape, such as by having an elongated length dimension, so that a user may position their palm and fingers, as desired, on or around the upper handle 11 when the user is manipulating the device 100 into and between the first 71 and second 72 positions. Preferably, a lower handle 31 may be elongated in shape, such as by having an elongated length dimension, so that a user may position their palm and fingers, as desired, on or around the lower handle 31 when the user is manipulating the device 100 into and between the first 71 and second 72 positions.

The device 100 may comprise a positioning pivot 21 which may be configured to enable the device 100 to be movable between the first position 71 and second position 72. In some embodiments, an upper handle 11 and a lower handle 31 may be pivotally coupled together via a positioning pivot 21 as perhaps best shown in FIGS. 1-3. In further embodiments, one or more upper arms 12, 13, may be pivotally coupled to one or more lower arms 32, 37, via a positioning pivot 21, similar to a pair of scissors.

A positioning pivot 21 may comprise any suitable pivotal coupling device or method. In some embodiments, a positioning pivot 21 may comprise a pin that may be inserted through one or more portions of an upper handle 11 and a lower handle 31. In further embodiments, a positioning pivot 21 may comprise a pin that may be inserted through one or more portions of one or more upper arms 12, 13, and one or more lower arms 32, 37. In other embodiments, a positioning pivot 21 may comprise a butt hinge, barrel hinge, butt/Mortise hinge, case hinge, flag hinge, strap hinge, H hinge, HL hinge, piano hinge, butterfly hinge, flush hinge, concealed hinge, continuous hinge, T-hinge, double-acting hinge, Soss hinge, counterflap hinge, flush hinge, coach hinge, rising butt hinge, double action spring hinge, tee hinge, friction hinge, security hinge, cranked hinge or storm-proof hinge, lift-off hinge, self closing or self positioning hinge, flexible material hinge, living hinge, or any other type or style of hinge suitable for pivotally and movably joining two objects together that may be coupled directly or indirectly to two or more of the upper handle 11, upper arms 12, 13, lower handle 31, and/or lower arms 32, 37.

In some embodiments, a positioning pivot 21 may comprise or provide a positioning pivot axis 81 that may extend through the positioning pivot 21. Generally, a positioning pivot axis 81 may comprise an axis that the upper handle 11 and lower handle 31 are pivotal in when the device 100 is moved between the first 71 and second 72 positions, and/or a positioning pivot axis 81 may comprise an axis that one or more upper arms 12, 13, and one or more lower arms 32, 37, are pivotal in when the device 100 is moved between the first 71 and second 72 positions.

Generally, the device 100 may be motivated between the first 71 and second 72 positions by manipulating the handles 11, 31. By squeezing or otherwise positioning the handles 11, 31, relatively closer together, the lower arms 32, 37, may be positioned relatively farther from the upper arms 12, 13, and the device 100 may be moved into the second position 72. Conversely, by releasing tension or otherwise positioning the handles 11, 31, relatively farther apart, the lower arms 32, 37, may be positioned relatively closer to the upper arms 12, 13, and the device 100 may be moved into the first position 71.

In preferred embodiments, the device 100 may be biased to the first position 71 so that the device 100 returns to or attempts to return to the first position 71 without intervention from a user. In preferred embodiments, the device 100 may be biased to the first position 71 via a spring. Example, springs may include a Tension/extension spring, Compression spring, Constant-force spring, Torsion spring, Variable spring, Coil spring, Flat spring, Machined spring, Serpentine spring, Cantilever spring, Hairspring or balance spring, Leaf spring, V-spring, Belleville washer or Belleville spring, Gas spring or gas piston, Mainspring, Negator spring, Progressive rate coil springs, Spring washer, Torsion spring, Wave spring, Rubber band, bungee cord, or other non-metallic elastic material, or any other material or device which is configured to endure deformation and resilient so as to return to its original shape after deformation.

In some embodiments, the device 100 may be biased to the first position 71 via a spring that may be coupled to a positioning pivot 21 so that the spring may be compressed or compressed to a greater degree when the device 100 is in the second position 72. In further embodiments, the device 100 may be biased to the first position 71 via a spring that may be coupled to the handles 11, 31, so that it is positioned between the handles 11, 31, and so that the spring may be compressed or compressed to a greater degree when the device 100 is in the second position 72. In further embodiments, the device 100 may be biased to the first position 71 via a spring that may be coupled to one or more of the upper arms 12, 13, and to one or more of the lower arms 32, 37, so that the spring may be extended or extended to a greater degree when the device 100 is in the second position 72. In still further embodiments, any suitable device or method may be used to biased the device 100 into the first position 71

The device 100 may comprise one or more upper arms 12, 13, that may be coupled to the upper handle 11 so that the upper arms 12, 13, may extend away from the upper handle 11. Generally, upper arms 12, 13, may be configured to couple a plate 51, 51A, 51B, to the upper handle 11, to position the plate 51, 51A, 51B, a desired distance from the upper handle 11 and in a desired orientation to the upper handle 11. Upper arms 12, 13, may be configured in any shape and size. For example, and in some embodiments, the device 100 may comprise a first upper arm 12 and a second upper arm 13 that may be generally linear and elongated in shape. As another example, the device 100 may comprise a first upper arm 12 and a second upper arm 13 that may be curved, such as by being convex curved relative to each other, and elongated in shape.

The device 100 may comprise a plate 51, 51A, 51B, that may be coupled to the one or more upper arms 12, 13, and more preferably coupled to the end(s) of the upper arm(s) 12, 13, most distal to the upper handle 11. A plate 51, 51A, 51B, may be configured in any shape and size. In some embodiments, a plate 51, 51A, 51B, may be configured with a rectangular shape, a trapezoid shape, a triangular shape, a half-circle shape, a square shape, or any other shape.

In some embodiments, a plate 51, 51A, 51B, may comprise a distal edge 55, a first lateral edge 56, a second lateral edge 57, and/or a proximal edge 58. The one or more plate pivots 52, 54, may be coupled to the plate 51, 51A, 51B, between the distal edge 55 and proximal edge 58 so that when the proximal edge 58 is positioned closest to the handles 11, 31, the distal edge 55 may be positioned farthest from the handles 11, 31, as perhaps best shown in FIGS. 4-7. A plate 51, 51A, 51B, may comprise a plate lower surface 59 which may be opposingly positioned to a plate upper surface 60 that the one or more plate pivots 52, 54, may be coupled to. In preferred embodiments, the plate 51, 51A, 51B, may comprise a distal edge 55 and a proximal edge 58, and the one or more plate pivots 52, 54, may be positioned closer to the distal edge 55 than to the proximal edge 58.

In preferred embodiments, and as perhaps best shown in FIGS. 1-9, a plate 51, 51A, may be configured with a rectangular shape so that the edges 55, 56, 57, 58, may be generally linear in shape and joined together at approximately right angles. In some embodiments, the device 100 may comprise a distal edge 55 and a proximal edge 58 that may be substantially parallel (plus or minus 10 degrees) to each other, and/or the device 100 may comprise a first lateral edge 56 and a second lateral edge 57 that may be substantially parallel (plus or minus 10 degrees) to each other. In further preferred embodiments, a distal edge 55 and/or a proximal edge 58 may be greater in size or dimension than the lateral edges 56, 57. For example, a distal edge 55 may have a distal length dimension (L1) (FIGS. 2, 8-10) and a lateral edge 56, 57, may have a lateral length dimension (L2) (FIGS. 2, 8-10), and the L2 may be between 10 percent and 40 percent of L1. In further preferred embodiments, L1 may be between 3 inches and 8 inches.

Figure 8:
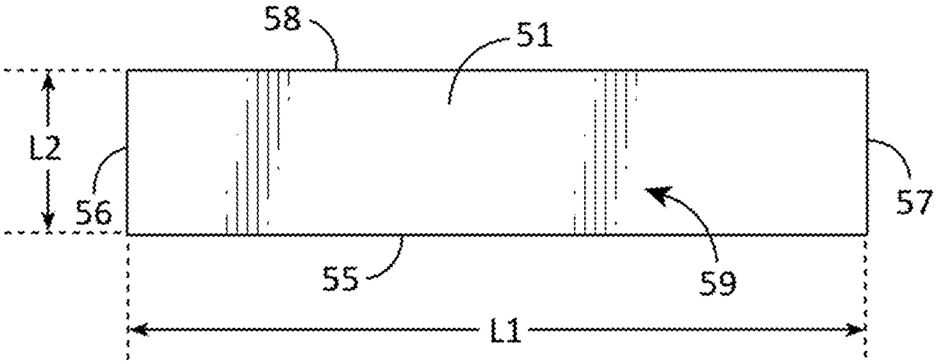
FIG. 8 illustrates an elevation view of an example of a plate of a granular material manipulation device according to various embodiments described herein.
Figure 9:
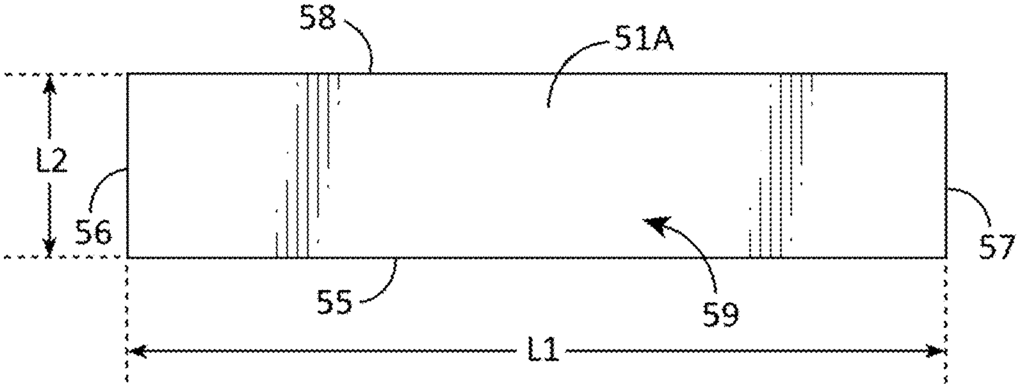
FIG. 9 shows an elevation view of another example of a plate of a granular material manipulation device according to various embodiments described herein.

In preferred embodiments, and as best illustrated by the example of FIG. 8, a plate 51 may comprise a distal edge 55 and a proximal edge 58 that may each be approximately 4.625 inches in length, such that L1 may be approximately 4.625 inches, and the plate 51, 51A, 51B, may comprise a first lateral edge 56 and a second lateral edge 57 that may each be approximately 1.0 inches in length, such that L2 may be approximately 1.0 inches. In further preferred embodiments, and as best illustrated by the example of FIG. 9, a plate 51, 51A, 51B, may comprise a distal edge 55 and a proximal edge 58 that may each be approximately 5.0 inches in length, such that L1 may be approximately 5.0 inches, and the plate 51, 51A, 51B, may comprise a first lateral edge 56 and a second lateral edge 57 that may each be approximately 1.125 inches in length, such that L2 may be approximately 1.125 inches.

Figure 10:
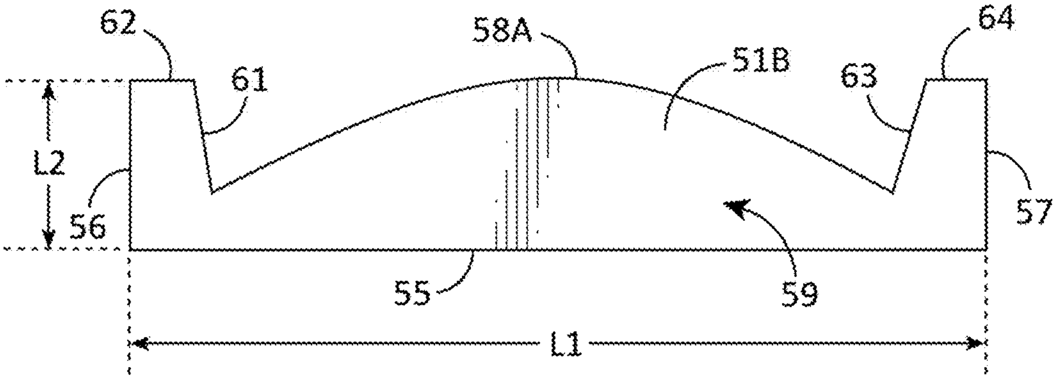
FIG. 10 depicts an elevation view of a further example of a plate of a granular material manipulation device according to various embodiments described herein.

In further preferred embodiments, and as shown in FIG. 10, a plate 51B may comprise a complex or non-rectangular shape. For example, a plate 51B may comprise a substantially linear distal edge 55 that may each be approximately 5.25 inches in length, such that L1 may be approximately 5.25 inches. The plate 51B may also comprise a first lateral edge 56 and a second lateral edge 57 that may each be substantially linear and that may each be approximately 1.0 inches in length, such that L2 may be approximately 1.0 inches. The plate 51B may comprise a proximal edge 58A that may not be linear in shape, such as by being curved with the middle of the proximal edge 58A being furthest, such as approximately 1.0 inches, from the distal edge 55. The proximal edge 58A may be coupled to a first medial edge 61, and the first medial edge 61 may be coupled to the first lateral edge 56 via a first joining edge 62. The proximal edge 58A may also be coupled to a second medial edge 63, and the second medial edge 63 may be coupled to the second lateral edge 57 via a second joining edge 64. Optionally, the first medial edge 61, first joining edge 62, second medial edge 63, and second joining edge 64 may be linear in shape, with the first joining edge 62 and second joining edge 64 being approximately parallel to the distal edge 55 and the first medial edge 61 and second medial edge 63 being angled away from the lateral edge 56, 57, that the are closest to, respectively.

A plate 51, 51A, 51B, may be pivotally coupled to the first upper arm 12 and/or to the second upper arm 13 via one or more plate pivots 52, 54. In preferred embodiments, the device 100 may comprise a plate 51, 51A, 51B, that may be pivotally coupled to a first upper arm 12 via a first plate pivot 52 and pivotally coupled to a second upper arm 13 via a second plate pivot 53.

In some embodiments, a plate pivot 52, 54, may comprise a pin that may be coupled to the plate 51, 51A, 51B, and movably coupled to an upper arm 12, 13, such as by being inserted through the upper arm 12, 13, so that the pin may pivot in the upper arm 12, 13. In further embodiments, a plate pivot 52, 54, may comprise a butt hinge, barrel hinge, butt/Mortise hinge, case hinge, flag hinge, strap hinge, H hinge, HL hinge, piano hinge, butterfly hinge, flush hinge, concealed hinge, continuous hinge, T-hinge, double-acting hinge, Soss hinge, counterflap hinge, flush hinge, coach hinge, rising butt hinge, double action spring hinge, tee hinge, friction hinge, security hinge, cranked hinge or stormproof hinge, lift-off hinge, self closing or self positioning hinge, flexible material hinge, living hinge, or any other type or style of hinge suitable for pivotally and movably joining two objects together that may be coupled directly or indirectly to the plate 51, 51A, 51B, and to one or more of the upper arms 12, 13.

In some embodiments, the device 100 may comprise a first plate pivot 52 which may comprise or provide a plate pivot axis 85 that may extend through the first plate pivot 52. In preferred embodiments, the device 100 may comprise a first plate pivot 52 and a second plate pivot 54 which may comprise or provide a plate pivot axis 85 that may extend through both the first plate pivot 52 and second plate pivot 54. Generally, a plate pivot axis 85 may comprise an axis that the plate 51, 51A, 51B, may be pivotal in or pivot around when the plate 51, 51A, 51B, is pivotally coupled to one or more upper arms 12, 13, via one or more plate pivots 52, 54, as perhaps best shown in FIGS. 1 and 2.

In some embodiments, the device 100 may comprise a plate 51, 51A, 51B, that may be coupled to a first upper arm 12 via a first plate pivot 52, and the first plate pivot 52 may provide a plate pivot axis 85 that the plate 51, 51A, 51B, is pivotal in. The plate 51, 51A, 51B, may also comprise a distal edge 55 that is substantially linear in shape, and the distal edge 58 may be substantially parallel (plus or minus 10 degrees) to the plate pivot axis 85 provided by the first plate pivot 52. In further embodiments, the plate pivot axis 85 provided by the first plate pivot 52 may be substantially parallel (plus or minus 10 degrees) to the positioning pivot axis 81 provided by a positioning pivot 21.

In some embodiments, the device 100 may comprise a plate 51, 51A, 51B, that may be coupled to a first upper arm 12 via a first plate pivot 52 and to a second upper arm 13 via a second plate pivot 54, and the first plate pivot 52 and second plate pivot 54 may provide a plate pivot axis 85 that the plate 51, 51A, 51B, is pivotal in. The plate 51, 51A, 51B, may also comprise a distal edge 55 that is substantially linear in shape, and the distal edge 58 may be substantially parallel (plus or minus 10 degrees) to the plate pivot axis 85. In further embodiments, the plate pivot axis 85 provided by the first plate pivot 52 and second plate pivot 54 may be substantially parallel (plus or minus 10 degrees) to the positioning pivot axis 81 provided by a positioning pivot 21.

In preferred embodiments, a plate 51, 51A, 51B, may be removably coupled to the one or more upper arms 12, 13, and/or removably coupled to the one or more plate pivots 52, 54, so that one or more plates 51, 51A, 51B, may be used interchangeably. For example, the device 100 may comprise two upper arms 12, 13, that may be slightly flexible, such as by being made from flexible metal, plastic, or other material that may be deformed and which may attempt to regain its shape after deformation, and two plate pivots 52, 54, that may each comprise a pin that may be coupled to the plate 51, 51A, 51B, and movably coupled to an upper arm 12, 13, such as by being inserted through the upper arm 12, 13, so that the pin may pivot in the upper arm 12, 13. By squeezing the upper arms 12, 13, together, the pins of the plate pivots 52, 54, may be removed or withdrawn from the upper arms 12, 13, so that one or more plates 51, 51A, 51B, may be removed and/or exchanged. By releasing the upper arms 12, 13, the pins of the plate pivots 52, 54, may be inserted into the upper arms 12, 13, to couple a desired plate 51, 51A, 51B, to the upper arms 12, 13.

The device 100 may comprise one or more lower arms 32, 37, that may be coupled to the lower handle 31 so that the one or more lower arms 32, 37, may extend away from the lower handle 31. Generally, lower arms 32, 37, may be configured to contact a portion of an object, e.g., a gold mining pan or a pan used to extract gold and other minerals from a placer deposit, that may be placed between the plate 51, 51A, 51B, and one or more lower arms 32, 37, when the device 100 is attempting to return to the first position 71. For example, a plate lower surface 59 and a distal edge 55 of a plate 51, 51A, 51B, may contact the inside wall surface and inside bottom surface, respectively, while the one or more lower arms 32, 37, may contact the outside wall surface of a portion of a gold mining pan placed between the plate 51, 51A, 51B, and lower arms 32, 37, when the device 100 is attempting to return to the first position 71. Preferably, the device 100 may be biased to being in the first position 71 so that the device 100 may be removably coupled to the pan by clamping the portion of the pan between the plate 51, 51A, 51B, and lower arms 32, 37, when the device 100 is attempting to return to the first position 71.

Lower arms 32, 37, may be configured in any shape and size. For example, and in some embodiments, the device 100 may comprise a first lower arm 32 and a second lower arm 37 that may be generally linear and elongated in shape. As another example, the device 100 may comprise a first lower arm 32 and a second lower arm 37 that may be curved, such as by being convex curved relative to each other, and elongated in shape. Preferably, the device 100 may comprise a first lower arm 32 and a second lower arm 37 that may be separated from each other. Optionally, the device 100 may comprise a single lower arm 32, 37, that may have one or more elements of a first lower arm 32 and a second lower arm 37, such as by having a first 35 and second 40 prong, a first 36 and second 41 prong distal surface, etc.

In some embodiments, a first lower arm 32 may comprise a first arm extension 33 and a first prong distal surface 36. In preferred embodiments, a first lower arm 32 may comprise a first arm extension 33, a first prong extension 34, and/or a first prong 35 having a first prong distal surface 36. A first arm extension 33 may be coupled to the lower handle 31, and a first prong 35 may be coupled to the first arm extension 33 via a first prong extension 34. A first prong distal surface 36 may comprise a portion of a first lower arm 32 that be configured to contact an object that is positioned between the plate 51, 51A, 51B, and a first lower arm 32 when the device 100 is attempting to return to the first position 71.

In some embodiments, a second lower arm 37 may comprise a second arm extension 38 and a second prong distal surface 41. In preferred embodiments, a second lower arm 37 may comprise a second arm extension 38, a second prong extension 39, and/or a second prong 40 having a second prong distal surface 41. A second arm extension 38 may be coupled to the lower handle 31, and a second prong 40 may be coupled to the second arm extension 38 via a second prong extension 39. Preferably, a second prong distal surface 41 may comprise a portion of a second lower arm 37 that be configured to contact an object that is positioned between the plate 51, 51A, 51B, and a second lower arm 37 when the device 100 is attempting to return to the first position 71.

Figure 2:
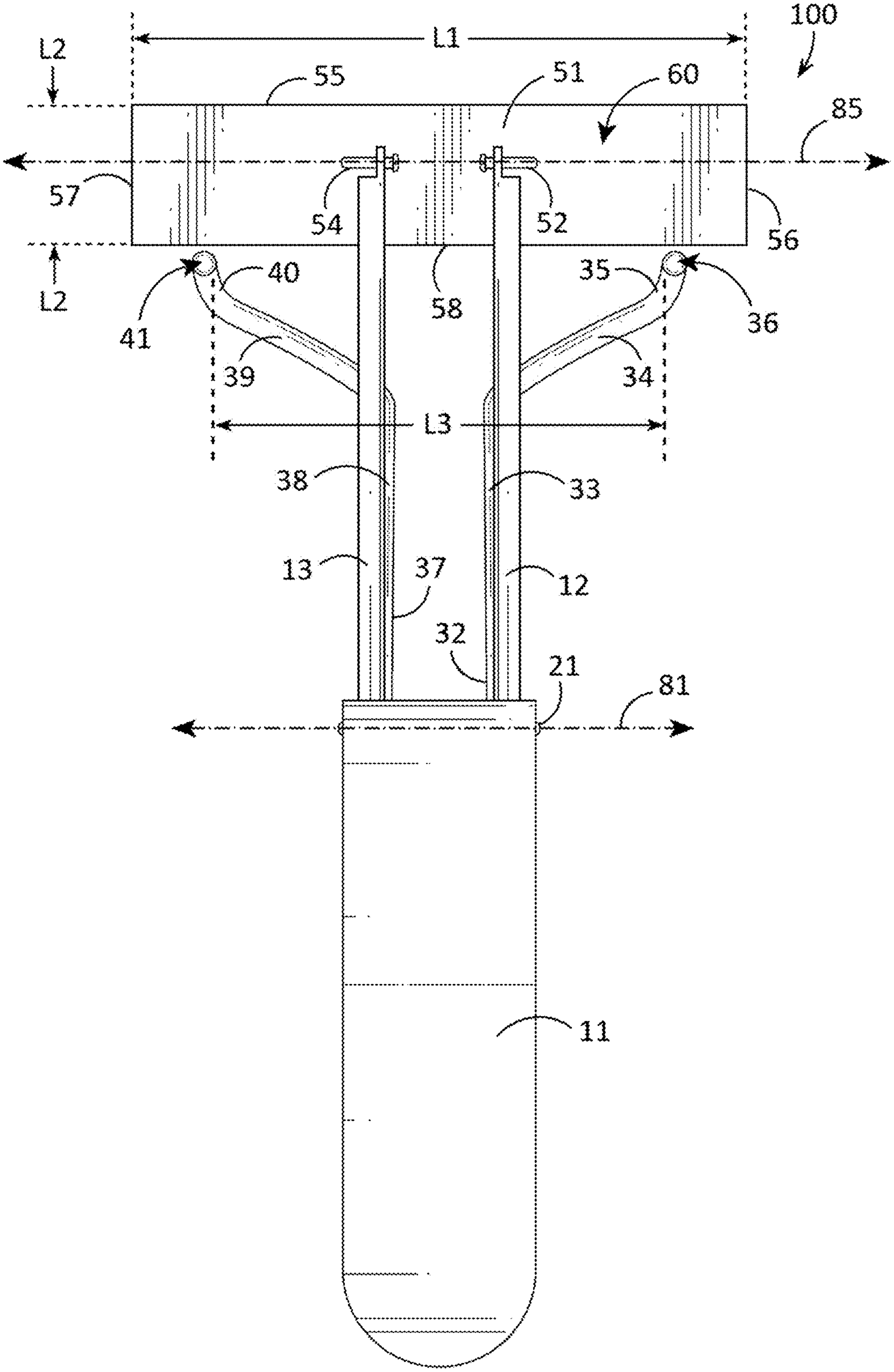
FIG. 2 illustrates a top plan view of an example of a granular material manipulation device according to various embodiments described herein.
Figure 3:
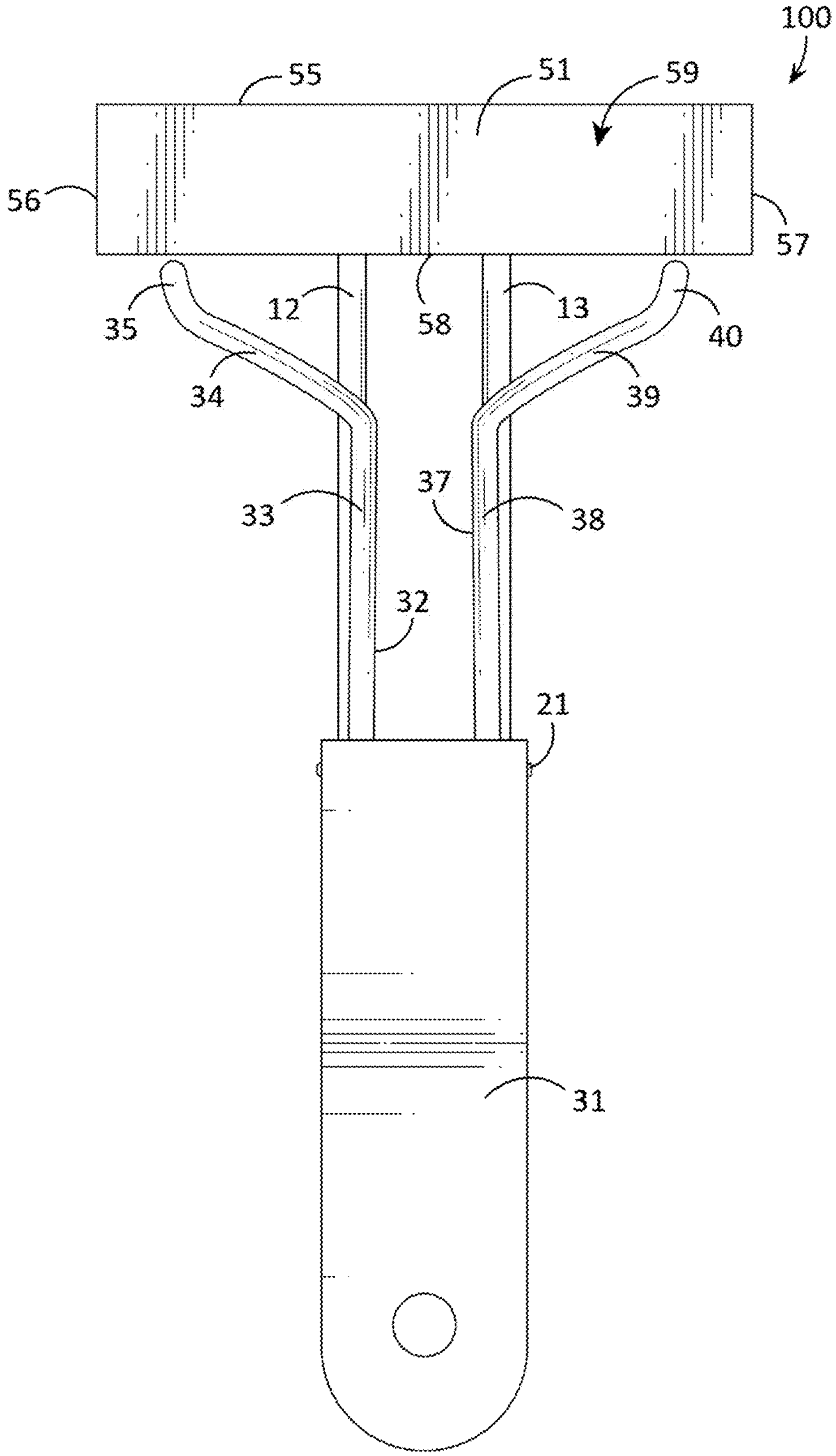
FIG. 3 shows a bottom plan view of an example of a granular material manipulation device according to various embodiments described herein.

In some embodiments, a first lower arm 32 may include a first prong 35 having a first prong distal surface 36, and the second lower arm 37 may include a second prong 40 having a second prong distal surface 41. The first prong distal surface 36 and second prong distal surface 41 may be separated from each other by a separation length dimension (L3) as shown in FIG. 2, and the separation length dimension is between 50 percent and 100 percent of the distal length dimension (L1) of the distal edge 55.

Figure 4:
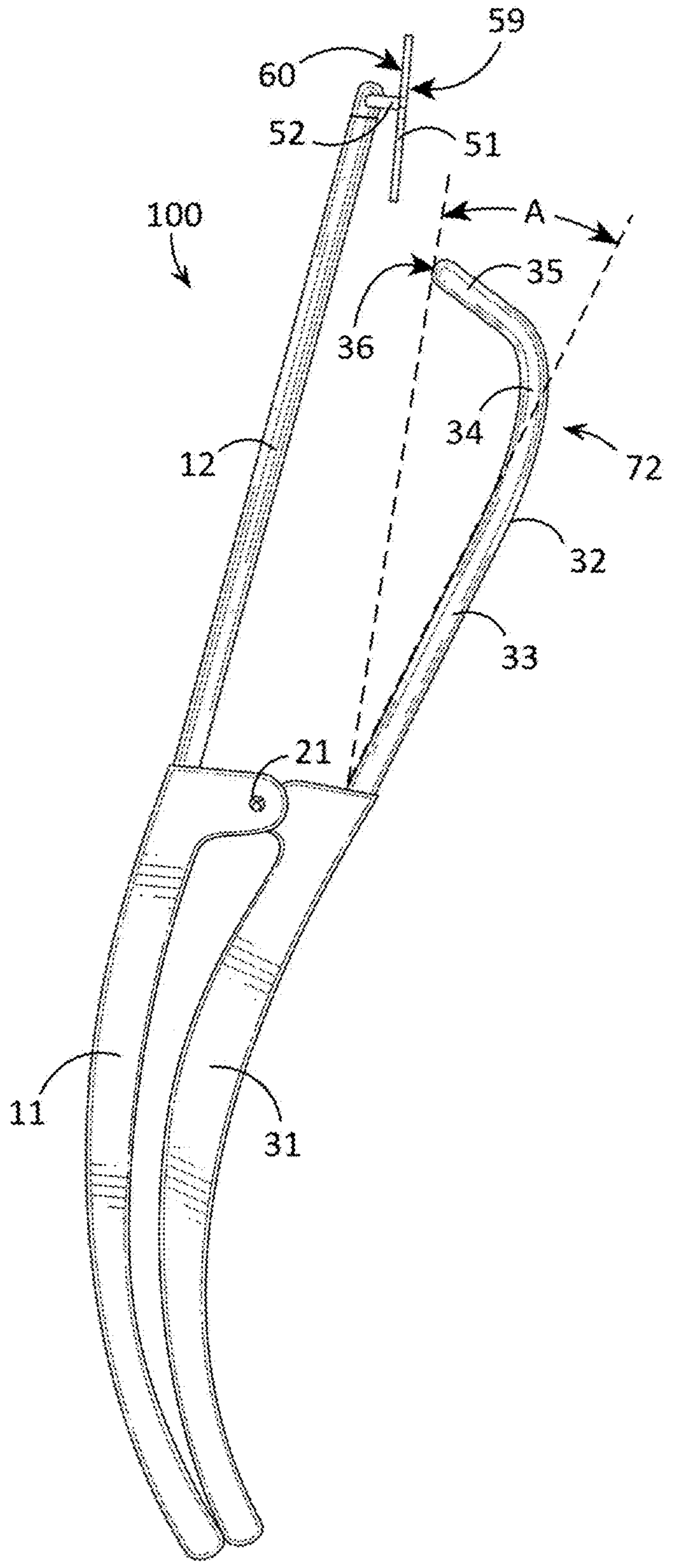
FIG. 4 depicts a first side elevation view of an example of a granular material manipulation device in a second position according to various embodiments described herein.
Figure 5:
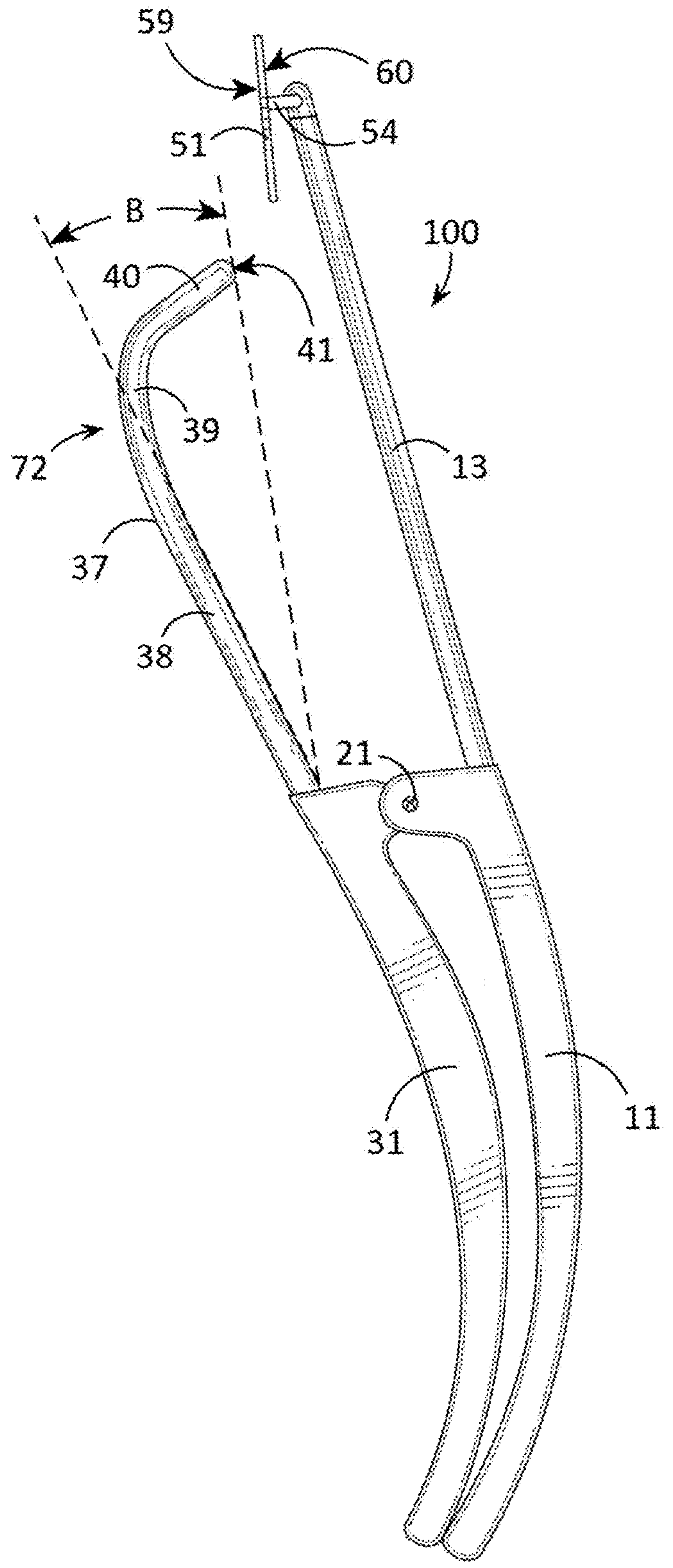
FIG. 5 illustrates a second side elevation view of an example of a granular material manipulation device in a second position according to various embodiments described herein.
Figure 6:
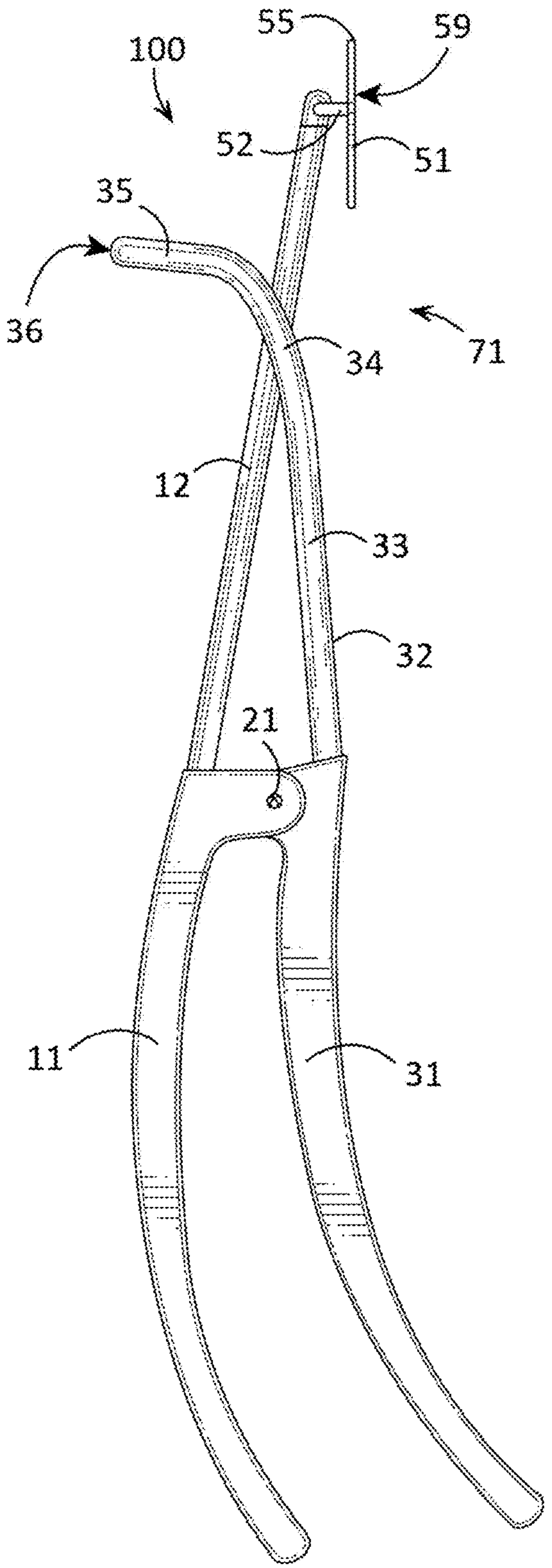
FIG. 6 shows a first side elevation view of an example of a granular material manipulation device in a first position according to various embodiments described herein.
Figure 7:
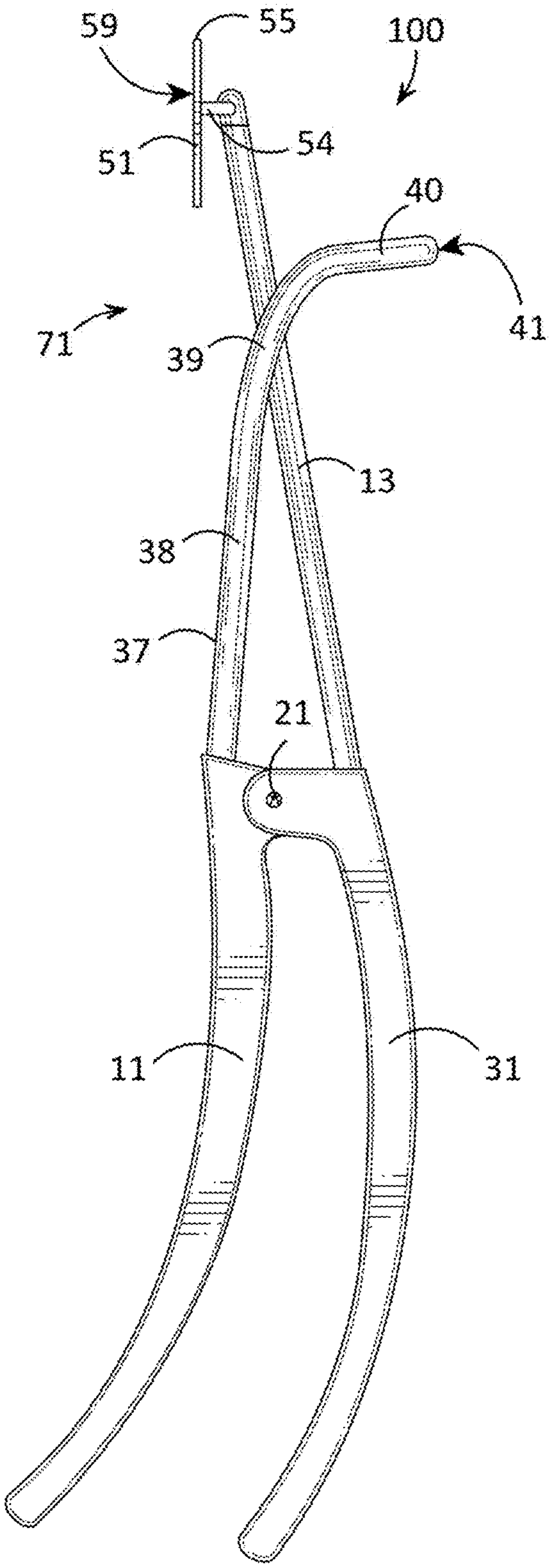
FIG. 7 depicts a second side elevation view of an example of a granular material manipulation device in a first position according to various embodiments described herein.

In some embodiments, a first lower arm 32 may comprise a first arm extension 33 and a first prong 35 having a first prong distal surface 36, and the first prong distal surface 36 may extend above the first arm extension 33 between 1 degree and 20 degrees and shown by angle A in FIG. 4. In some embodiments, a second lower arm 37 may comprise a second arm extension 38 and a second prong 40 having a second prong distal surface 41, and the second prong distal surface 41 may extend above the second arm extension 38 between 1 degree and 20 degrees and shown by angle B in FIG. 5. In preferred embodiments, the device 100 may comprise a first prong distal surface 36 and a second prong distal surface 41 that may both be positioned above the first upper arm 12 and second upper arm 13 when the device 100 is in the first position 71 as perhaps best shown by FIGS. 6 and 7. In preferred embodiments, the device 100 may comprise a first lower arm 32 having a first prong distal surface 36 and a second lower arm 37 having a second prong distal surface 41, and the first prong distal surface 36 and the second prong distal surface 41 may both be positioned above the first upper arm 12 and second upper arm 12 when the device 100 is in the first position 71 as perhaps best shown by FIGS. 6 and 7.

Preferably, the device 100 may be used to keep gold and other minerals along with a desired portion of a placer deposit in a desired portion of a gold mining pan. When using the device 100, a user may grasp and squeeze the upper handle 11 and lower handle 31 together to move the device into the second position 72, and then a desired portion of a gold mining pan or a pan used to extract gold and other minerals from a placer deposit, that may be placed between the plate 51, 51A, 51B, and one or more lower arms 32, 37, and the device 100 may then be allowed to attempt to return to the first position 71 such that the device 100 may be removably coupled to the gold mining pan. Preferably, a user may removably couple the device 100 to a gold mining pan after a placer deposit is in the pan by inserting the plate 51, 51A, 51B, into the placer deposit so that the distal edge 55 contacts the inside bottom of the pan and so that the lateral edges 56, 57, contact the inside surfaces of the walls of the pan. The user may then operate the pan with water and almost all—if not all—of the gold and desired materials may remain trapped between the plate 51, 51A, 51B, and pan wall/pan bottom as the user washes away the undesired portion of the placer deposit. Depending on the size and shape of the 51, 51A, 51B, selected by the user and attached to the upper arms 12, 13, the user may tailor the amount and type of gold and desired materials trapped between the plate 51, 51A, 51B, and pan wall/pan bottom as the user washes away the undesired portion of the placer deposit.

While some exemplary shapes and sizes have been provided for elements of the device 100, it should be understood to one of ordinary skill in the art that the handles 11, 31, upper arms 12, 13, lower arms 32, 37, plate 51, 51A, 51B, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A granular material manipulation device, the device comprising:

an upper handle;

a lower handle;

a first upper arm coupled to the upper handle and extending away from the upper handle;

a first lower arm coupled to the lower handle and extending away from the lower handle;

a positioning pivot configured to enable the device to be movable between a first position and a second position; wherein the first lower arm and first upper arm are positioned relatively closer together when the device is in the first position, wherein the first lower arm and first upper arm are positioned relatively farther apart when the device is in the second position, and wherein the device is biased to being in the first position; and a plate pivotally coupled to the first upper arm via a plate pivot, wherein the plate comprises a distal edge and a proximal edge, wherein the distal edge is opposingly positioned to the proximal edge, wherein the distal edge forms a portion of the plate that is most distal to the upper handle when the proximal edge forms a portion of the plate that is most proximal to the upper handle, and wherein the plate pivot is positioned closer to the distal edge than to the proximal edge.

2. The device of claim 1, wherein the distal edge is linear in shape.

3. The device of claim 2, wherein the plate pivot provides a plate pivot axis that the plate is pivotal in, wherein the distal edge that is substantially linear in shape, and wherein the distal edge is substantially parallel to the plate pivot axis.

4. The device of claim 1, wherein the distal edge has a distal length dimension, wherein the plate has a lateral edge having a lateral length dimension, and wherein the lateral length dimension is between 10 percent and 40 percent of the distal length dimension.

5. The device of claim 4, wherein the distal length dimension is between 3 inches and 8 inches.

6. The device of claim 1, wherein the plate pivot provides a plate pivot axis that the plate is pivotal in, wherein the positioning pivot provides a positioning pivot axis that the upper handle and lower handle are pivotal in, and wherein the plate pivot axis is substantially parallel to the positioning pivot axis.

7. The device of claim 1, wherein the distal edge is substantially parallel to the proximal edge.

8. The device of claim 1, wherein the first lower arm comprises a first arm extension and a first prong having a first prong distal surface, and wherein the first prong extends above the first arm extension between 1 degree and 20 degrees.

9. A granular material manipulation device, the device comprising:

an upper handle;

a lower handle;

a first upper arm coupled to the upper handle and extending away from the upper handle;

a second upper arm coupled to the upper handle and extending away from the upper handle;

a first lower arm coupled to the lower handle and extending away from the lower handle;

a second lower arm coupled to the lower handle and extending away from the lower handle;

a positioning pivot configured to enable the device to be movable between a first position and a second position; wherein the first lower arm and second lower arm are positioned relatively closer to the first upper arm and second upper arm when the device is in the first position, wherein the first lower arm and second lower arm are positioned relatively farther from the first upper arm and second upper arm when the device is in the second position, and wherein the device is biased to the first position; and a plate pivotally coupled to the first upper arm via a first plate pivot and pivotally coupled to the second upper arm via a second plate pivot.

10. The device of claim 9, wherein the plate comprises a distal edge and an opposingly positioned proximal edge, wherein the distal edge forms a portion of the plate that is most distal to the upper handle when the proximal edge forms a portion of the plate that is most proximal to the upper handle, and wherein the distal edge is linear in shape.

11. The device of claim 9, wherein the plate comprises a distal edge and an opposingly positioned proximal edge, wherein the distal edge forms a portion of the plate that is most distal to the upper handle when the proximal edge forms a portion of the plate that is most proximal to the upper handle, wherein the first plate pivot and the second plate pivot provide a plate pivot axis that the plate is pivotal in, wherein the distal edge is substantially linear in shape, and wherein the distal edge is substantially parallel to the plate pivot axis.

12. The device of claim 9, wherein the plate comprises a distal edge, a proximal edge, and a lateral edge, wherein the distal edge is opposingly positioned to the proximal edge, wherein the distal edge forms a portion of the plate that is most distal to the upper handle when the proximal edge forms a portion of the plate that is most proximal to the upper handle, wherein the distal edge has a distal length dimension, wherein the lateral edge has a lateral length dimension, and wherein the lateral length dimension is between 10 percent and 40 percent of the distal length dimension.

13. The device of claim 12, wherein the distal length dimension is between 3 inches and 8 inches.

14. The device of claim 9, wherein the first plate pivot and second plate pivot provide a plate pivot axis that the plate is pivotal in, wherein the positioning pivot provides a positioning pivot axis that the upper handle and lower handle are pivotal in, and wherein the plate pivot axis is substantially parallel to the positioning pivot axis.

15. The device of claim 9, wherein the plate comprises a distal edge and a proximal edge, wherein the distal edge is opposingly positioned to the proximal edge, wherein the distal edge forms a portion of the plate that is most distal to the upper handle when the proximal edge forms a portion of the plate that is most proximal to the upper handle, and wherein the plate pivot is positioned closer to the distal edge than to the proximal edge.

16. The device of claim 9, wherein the plate comprises a distal edge and a proximal edge, wherein the distal edge is opposingly positioned to the proximal edge, wherein the distal edge forms a portion of the plate that is most distal to the upper handle when the proximal edge forms a portion of the plate that is most proximal to the upper handle, and wherein the distal edge is substantially parallel to the proximal edge.

17. The device of claim 9, wherein the first lower arm comprises a first prong having a first prong distal surface, wherein the second lower arm comprises a second prong having a second prong distal surface, wherein the first prong distal surface and second prong distal surface are separated from each other by a separation length dimension, and wherein the separation length dimension is between 50 percent and 100 percent of the distal length dimension.

18. The device of claim 9, wherein the first lower arm comprises a first arm extension and a first prong having a first prong distal surface, and wherein the first prong extends above the first arm extension between 1 degree and 20 degrees.

19. The device of claim 9, wherein the first lower arm comprises a first prong distal surface and the second lower arm comprises a second prong distal surface, and wherein the first prong distal surface and the second prong distal surface are both positioned above the first upper arm and second upper arm when the device is in the first position.

* * * * *